United States Patent
Allison et al.

(10) Patent No.: US 8,001,354 B2
(45) Date of Patent: Aug. 16, 2011

(54) IMPLEMENTING DYNAMIC PHYSICAL MEMORY REALLOCATION

(75) Inventors: Brian David Allison, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 11/741,049

(22) Filed: Apr. 27, 2007

(65) Prior Publication Data

US 2008/0271054 A1  Oct. 30, 2008

(51) Int. Cl.
*G06F 12/02* (2006.01)
(52) U.S. Cl. .................... 711/170; 711/171; 711/173
(58) Field of Classification Search .............. 711/170, 711/171, 173
See application file for complete search history.

(56) References Cited

U.S. PATENT DOCUMENTS

| | | | |
|---|---|---|---|
| 6,182,252 B1 * | 1/2001 | Wong et al. ................. | 714/708 |
| 7,272,734 B2 | 9/2007 | Gooding | |
| 2005/0071595 A1 * | 3/2005 | Irish et al. .................. | 711/170 |
| 2005/0257020 A1 * | 11/2005 | Kashyap et al. ............. | 711/170 |
| 2005/0278494 A1 * | 12/2005 | Hillier et al. ............... | 711/162 |
| 2006/0187739 A1 | 8/2006 | Borkenhagen | |

* cited by examiner

*Primary Examiner* — Jae U Yu
(74) *Attorney, Agent, or Firm* — Joan Pennington

(57) ABSTRACT

A computer system, computer program product, and method implement dynamic physical memory reallocation. A system management interface (SMI) Handler and an Operating System (OS) are arranged for exchanging communications. Periodically the SMI Handler queries the operating system to identify a percentage of available memory currently being utilized. Responsive to the identified percentage of available memory currently being utilized, physical memory is dynamically reallocated.

14 Claims, 4 Drawing Sheets

PRIOR ART

IMPLEMENTING DYNAMIC PHYSICAL MEMORY REALLOCATION

FIELD OF THE INVENTION

The present invention relates generally to the data processing field, and more particularly, relates to a computer system including a memory controller, computer program product, and method for implementing dynamic physical memory reallocation.

DESCRIPTION OF THE RELATED ART

Memory mirroring has been used in highly reliable systems for several years. As a computer system is configured at initial program load (IPL) time, the user might choose to mirror all memory, or only a portion of the available memory.

For example, FIG. 1 illustrates a prior art memory system utilizing mirroring including a memory controller 102 with a port A memory 104 and a port B memory 104, each having a size X. As shown in FIG. 1, a mirroring arrangement provides a total memory equals a size X for a complete redundancy measure providing increased reliability.

FIG. 2 illustrates another prior art memory system including a memory controller 202 with a port A memory 204 and a port B memory 104, each having a size X. Configuring memory in a non-interleaved fashion or effectively stacking memory regions provides a total memory equals a size 2X as shown in FIG. 2.

U.S. patent application Ser. No. 11/064,741 filed Feb. 24, 2005, to John M. Borkenhagen et al., entitled Methods and Apparatus for Using Memory, U.S. patent Publication No. US 2006/0187739 A1 published Nov. 2, 2006 and assigned to the present assignee, discloses a method for using memory including employing memory stacking, memory mirroring and memory interleaving in a total memory to reduce a number of memory entries that are written to an input/output (I/O) device while a portion of the total memory is replaced; and storing data in the total memory.

A need exists for an effective mechanism for allowing dynamic adjustment of a physical memory to provide on-demand reliability versus capacity tradeoff.

SUMMARY OF THE INVENTION

A principal aspect of the present invention is to provide a computer system, computer program product, and method for implementing dynamic physical memory reallocation. Other important aspects of the present invention are to provide such memory controller and method for implementing dynamic physical memory reallocation substantially without negative effect and that overcome many of the disadvantages of prior art arrangements.

In brief, a computer system, computer program product, and method are provided for implementing dynamic physical memory reallocation. A system management interface (SMI) Handler and an Operating System (OS) are arranged for exchanging communications. Periodically the SMI Handler queries the operating system to identify a percentage of available memory currently being utilized. Responsive to the identified percentage of available memory currently being utilized, physical memory is dynamically reallocated.

In accordance with features of the invention, responsive to a predefined low percentage of available memory currently being utilized, a portion of the physical memory capacity is dynamically reallocated as mirrored. Responsive to a predefined high percentage of available memory currently being utilized, dynamically reallocating of the mirrored memory is performed to provide additional memory capacity.

In accordance with features of the invention, when a portion of the physical memory capacity is dynamically reallocated as mirrored, the SMI Handler communicated with the Operating System to page out a defined portion of the physical memory and to update tables to reflect the decreased portion of the physical memory. The SMI Handler sets defined registers to reconfigure the defined portion of the physical memory as mirrored memory.

In accordance with features of the invention, when a portion of the mirrored physical memory is dynamically reallocated as stacked, the SMI Handler sets defined registers to reconfigure the portion of the physical memory as stacked memory. The SMI Handler communicated with the Operating System to update tables to reflect the increased portion of available physical memory.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, methods are provided for implementing dynamic physical memory reallocation. Methods of the present invention are implemented to allow dynamic adjustment of a physical memory to provide on-demand reliability versus capacity tradeoff.

In accordance with features of the invention, during periods of low system load, excess capacity advantageously is reallocated as mirrored memory. During periods of high system load, mirrored memory advantageously is reallocated to increase memory capacity. Further when the system needs to run a critical application, but does not have enough mirrored memory in which to run that application, then memory currently allocated for non-critical applications is paged out and reallocated as mirrored to run the critical application.

Figure 1:
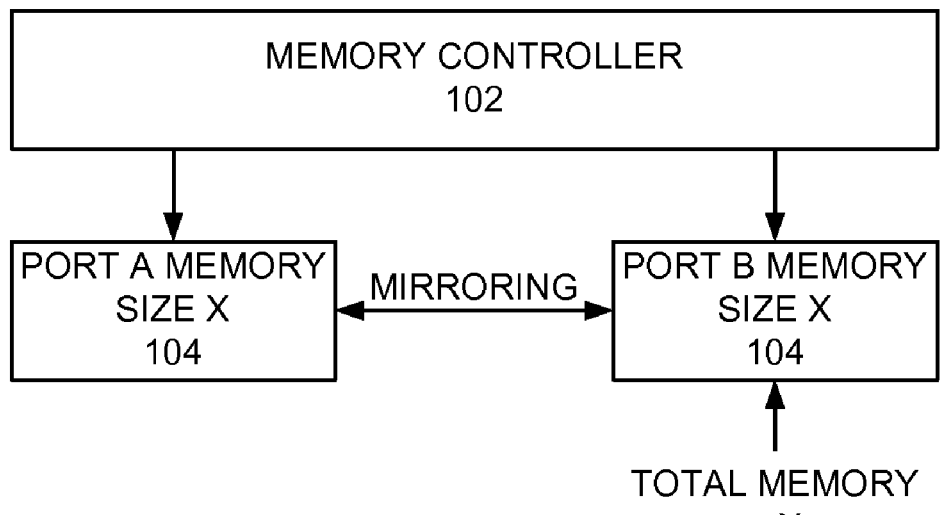
FIG. 1 illustrates a prior art memory system utilizing conventional mirroring.
Figure 2:
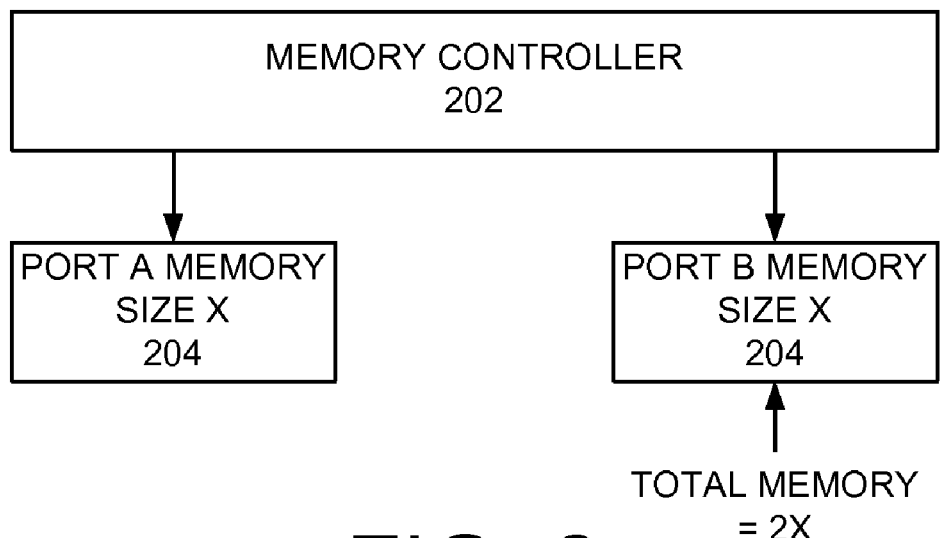
FIG. 2 illustrates a prior art memory system utilizing conventional memory stacking regions.
Figure 3:
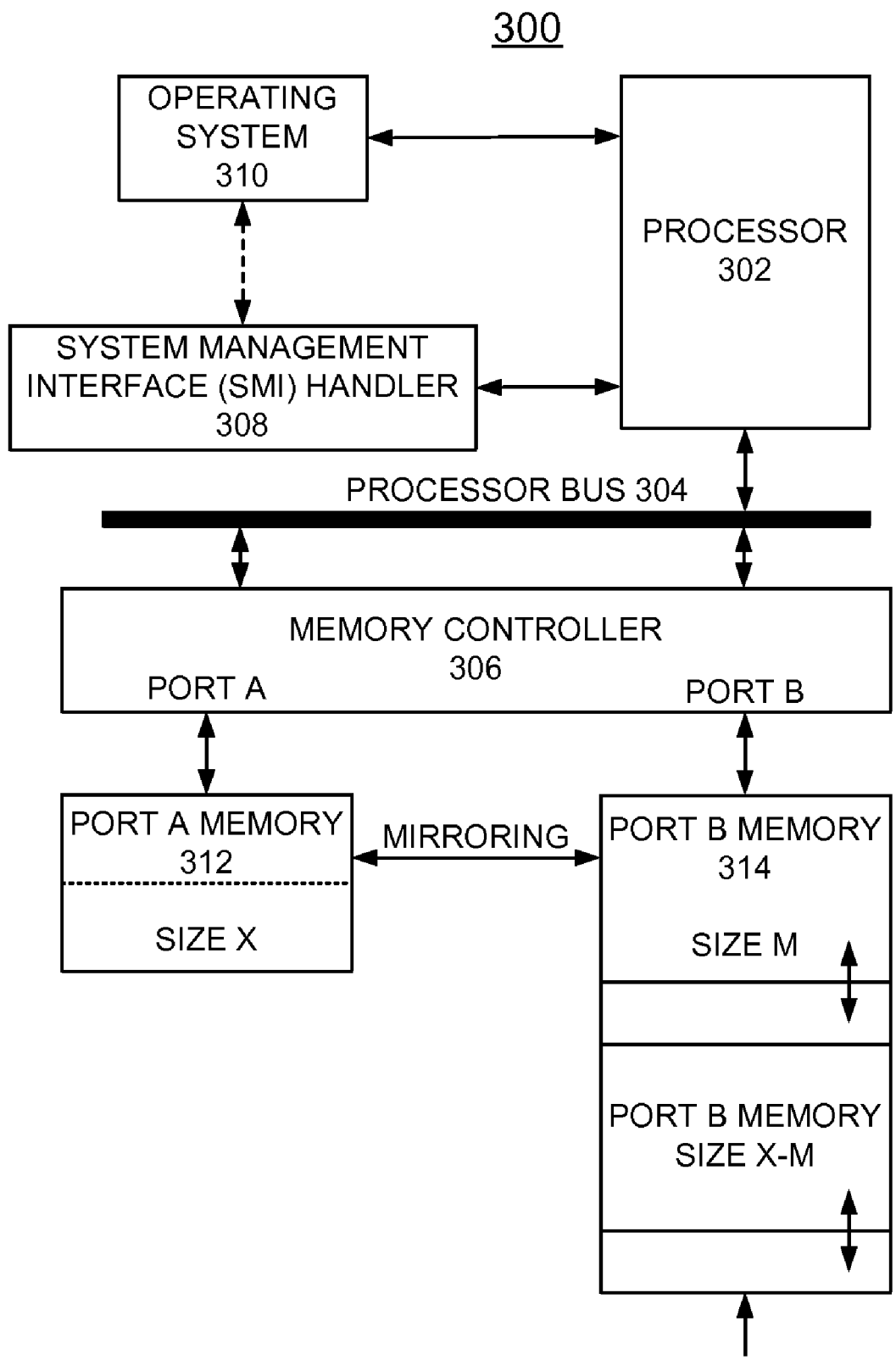
FIG. 3 is a block diagram illustrating a computer system including a memory controller for implementing dynamic physical memory reallocation in accordance with the preferred embodiment.

Having reference now to the drawings, in FIG. 3, there is shown a computer system generally designated by the reference character 300 for implementing dynamic physical memory reallocation in accordance with the preferred embodiment.

Computer system 300 includes at least one main processor 302 coupled by a processor bus 304 to a memory controller 306 in accordance with the preferred embodiment. Computer system 300 includes a system management interface (SMI) Handler 308 in accordance with the preferred embodiment and coupled to an Operating System (OS) 310.

Both the SMI Handler 308 and the Operating System 310 directly interface to the main processor 302. Commands issued by the SMI Handler 308 are forwarded by the main processor 302 via the processor bus to the memory controller 306, for example, for changing configuration registers within the controller and invoking the memory controller engine for performing mirror copy.

In accordance with features of the invention, communications are provided between the SMI Handler 308 with Operating System 310 as to how much physical memory is currently available. Likewise, by similar communications, the Operating System 310 communicates with the SMI Handler 308 how much of the available physical memory is currently being utilized.

The SMI Handler 308 indirectly interfaces to the Operating System 310 as indicated by a dashed line. The SMI Handler 308 posts information in main memory, and surfaces an interrupt to the Operating System 310. Then the Operating System 310 reads the posted memory location for the interrupt, and responds accordingly.

Computer system 300 is shown in simplified form sufficient for understanding the present invention. The illustrated computer system 300 is not intended to imply architectural or functional limitations. The present invention can be used with various hardware implementations and systems and various other internal hardware devices, for example, a plurality of main processors could be used.

Computer system 100 includes a system memory including a respective memory 312 and a memory 314 coupled to a respective Port A, and Port B of the memory controller 306. Each memory 312, 314 is, for example, a dynamic random access memory (DRAM). As shown, each memory 312, 314 has a size X. Memory 314 includes an adjustable mirroring portion indicated by size M with an adjustable boundary and an adjustable available capacity portion indicated by size X-M. Configuring the memory 314 with both adjustable mirroring and non-interleaved fashion stacking memory regions M, X-M provides a total memory equals a size X+(X-M) as shown in FIG. 3.

In accordance with features of the invention, methods enable a user to specify a minimum mirroring requirement, if any. This advantageously preserves mirroring of the memory addresses in which the users most critical applications are running.

Figure 4:
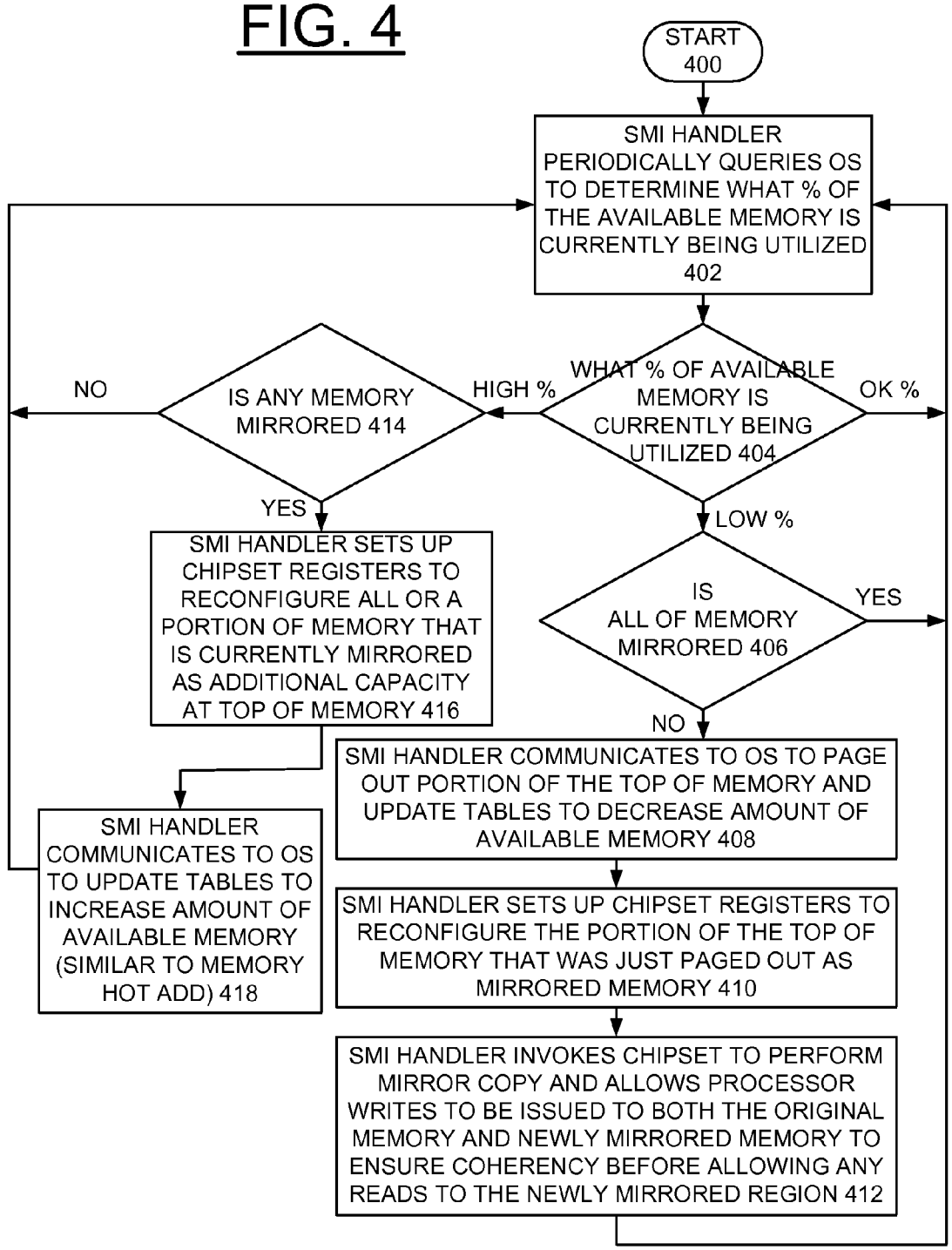
FIG. 4 is a flow chart illustrating exemplary steps of a dynamic physical memory reallocation method in accordance with the preferred embodiment.

Referring now to FIG. 4, there are shown exemplary steps of a dynamic physical memory reallocation method in accordance with the preferred embodiment starting at a block 400. As indicated at a block 402, the SMI Handler 308 periodically queries the Operating System 310 to determine what percentage (%) of the available memory is currently being utilized.

As indicated at a decision block 404, when an acceptable or OK % of available memory is currently being utilized, then the operations return to block 402 for the SMI Handler 308 to continue periodically querying the Operating System 310 to determine what percentage (%) of the available memory is currently being utilized.

As indicated at a decision block 404, when a low % of available memory is currently being utilized, then checking whether all of the memory is mirrored as indicated at a decision block 406. When all of the memory is mirrored, then the operations return to block 402 for the SMI Handler 308 to continue periodically querying the Operating System 310 to determine what percentage (%) of the available memory is currently being utilized.

When all of the memory is not mirrored, then the SMI Handler 308 communicates to the Operating System 310 to page out a portion of the top of memory and update tables to decrease the amount of available memory as indicated at a block 408. Then the SMI Handler 308 sets predefined chipset registers to reconfigure the portion of the top of the memory that was just paged out as mirrored memory as indicated at a block 410. The SMI Handler 308 invokes chipset to perform a mirror copy and allows processor writes to be issued to both the original memory and the newly mirrored memory to ensure coherency before allowing any reads to the newly mirrored memory region as indicated at a block 412. Then the operations return to block 402 for the SMI Handler 308 to continue periodically querying the Operating System 310 to determine what percentage (%) of the available memory is currently being utilized.

As indicated at a decision block 404, when a high % of available memory is currently being utilized, then checking whether any of the memory is mirrored as indicated at a decision block 414. When none of the memory is mirrored, then the operations return to block 402 for the SMI Handler 308 to continue periodically querying the Operating System 310 to determine what percentage (%) of the available memory is currently being utilized.

When any of the memory is mirrored, then the SMI Handler 308 sets predefined chipset registers to reconfigure all or a portion of the memory that is currently mirrored memory as additional capacity at the top of the memory as indicated at a block 416. Then as indicated at a block 418 the SMI Handler 308 communicates to the Operating System 310 to update tables to increase amount of available memory, for example, similar to a memory hot add. Then the operations return to block 402 for the SMI Handler 308 to continue periodically querying the Operating System 310 to determine what percentage (%) of the available memory is currently being utilized.

It should be understood that the present invention is not limited to the exemplary steps shown in FIG. 4 for implementing the dynamic physical memory reallocation method. The present invention can be used with various functions performed by either the Operating System or the SMI Handler.

Figure 5:
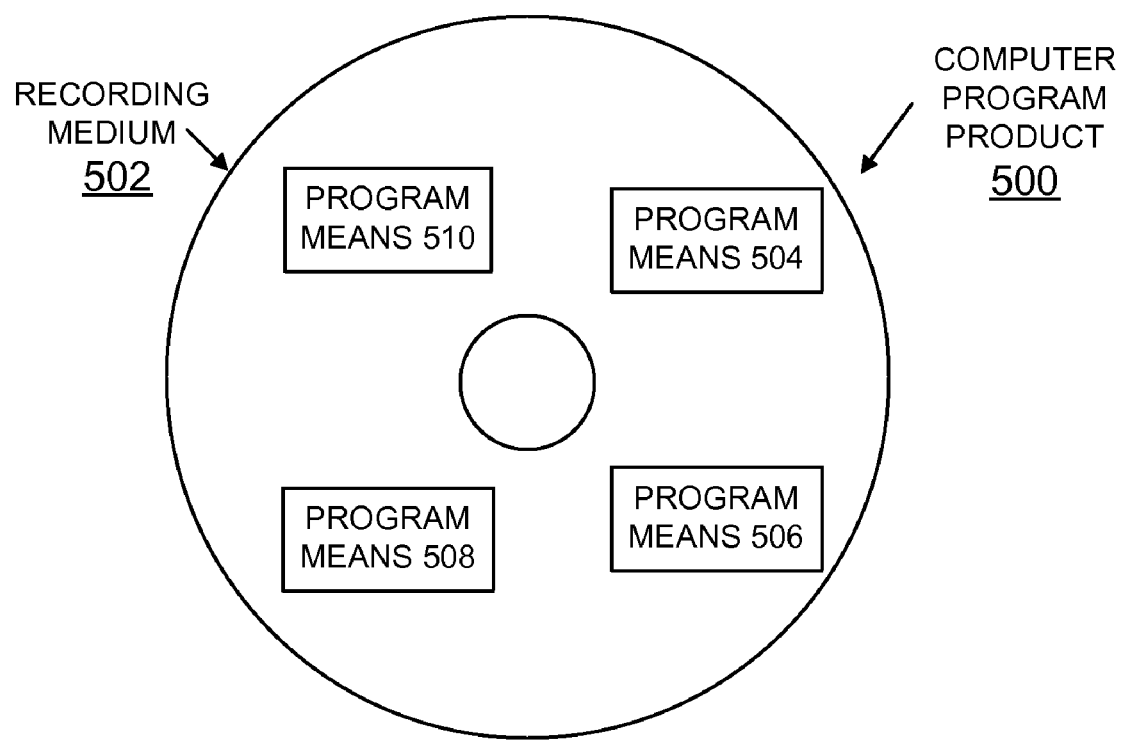
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, or a similar computer program product. Recording medium 502 stores program means 504, 506, 508, 510 on the medium 502 for carrying out the methods for implementing dynamic physical memory reallocation of the preferred embodiment in the system 300 of FIG. 3.

A sequence of program instructions or a logical assembly of one or more interrelated modules defined by the recorded program means 504, 506, 508, 510, direct the computer system 300 for implementing dynamic physical memory reallocation of the preferred embodiment.

While the present invention has been described with reference to the details of the embodiments of the invention shown in the drawing, these details are not intended to limit the scope of the invention as claimed in the appended claims.

What is claimed is:

1. A method for implementing dynamic physical memory reallocation using a memory controller in a computer system comprising the steps of:

providing a system management interface (SMI) Handler and an Operating System coupled together and directly interfaced to a main processor, said SMI Handler and said Operating System exchanging communications;

using the SMI Handler, periodically querying the Operating System to identify a percentage of available memory in the computer system currently being utilized; and responsive to an identified predefined high percentage of available memory currently being utilized, the SMI Handler dynamically reallocating the physical memory including selectively reallocating all or a portion of mirrored memory as additional capacity of available memory to be utilized to increase an amount of available memory in the computer system, providing increased memory capacity to be utilized and decreasing said mirrored memory.

2. The method for implementing dynamic physical memory reallocation as recited in claim 1 wherein the step of dynamically reallocating the physical memory includes the step of dynamically reallocating a portion of the physical memory capacity as mirrored, responsive to identifying a predefined low percentage of available memory currently being utilized.

3. The method for implementing dynamic physical memory reallocation as recited in claim 2 wherein dynamically reallocating a portion of the physical memory capacity as mirrored includes the step of the SMI Handler communicating with the Operating System to page out a defined portion of the physical memory.

4. The method for implementing dynamic physical memory reallocation as recited in claim 3 further includes the step of the SMI Handler communicating with the Operating System to update tables to reflect a decreased portion of available physical memory.

5. The method for implementing dynamic physical memory reallocation as recited in claim 3 further includes the step of the SMI Handler setting predefined registers to reconfigure the defined portion of the physical memory as mirrored memory.

6. The method for implementing dynamic physical memory reallocation as recited in claim 1 wherein the step of performing dynamical reallocation of the mirrored memory to provide additional memory capacity includes the step of the SMI Handler setting predefined registers to reconfigure the portion of the physical memory as stacked memory.

7. The method for implementing dynamic physical memory reallocation as recited in claim 6 further includes the step of the SMI Handler communicating with the Operating System to update tables to reflect the increased portion of available physical memory.

8. A computer system for implementing dynamic physical memory reallocation comprising:
    a processor;
    a memory controller coupled to said processor;
    a system management interface (SMI) Handler coupled to said processor and said memory controller;
    an Operating System (OS) coupled to said processor and said SMI Handler; said SMI Handler and said Operating System exchanging communications;
    said SMI Handler, periodically querying said Operating System to identify a percentage of available memory in the computer system currently being utilized; and
    responsive to an identified predefined high percentage of available memory currently being utilized, issuing commands for dynamically reallocating the physical memory including selectively reallocating all or a portion of mirrored data to provide additional memory capacity, responsive to identifying said predefined high percentage of available memory currently being utilized to increase an amount of available memory in the computer system providing increased memory capacity to be utilized and decreasing said mirrored memory.

9. The computer system for implementing dynamic physical memory reallocation as recited in claim 8 wherein said SMI Handler issues commands for dynamically reallocating a portion of the physical memory capacity as mirrored, responsive to identifying a predefined low percentage of available memory currently being utilized.

10. The computer system for implementing dynamic physical memory reallocation as recited in claim 9 wherein said memory controller, responsive to said SMI Handler, sets predefined chipset configuration registers to reconfigure the defined portion of the physical memory as mirrored memory.

11. The computer system for implementing dynamic physical memory reallocation as recited in claim 8 wherein said memory controller, responsive to said SMI Handler sets predefined chipset configuration registers to reconfigure the portion of the physical memory as stacked memory.

12. The computer system for implementing dynamic physical memory reallocation as recited in claim 8 wherein said SMI Handler communicates with the Operating System to update tables to reflect the increased portion of available physical memory.

13. A computer storage medium storing a computer program product for implementing dynamic physical memory reallocation in a computer system, said computer program product including instructions executed by the computer system to cause the computer system to perform the steps of:
    exchanging communications between a system management interface (SMI) Handler and an Operating System (OS);
    periodically querying the Operating System with the SMI Handler to identify a percentage of available memory currently being utilized; and
    dynamically reallocating the physical memory responsive to an identified predefined high percentage of available memory currently being utilized including setting registers to selectively reconfigure and reallocate all or a portion of mirrored data memory to provide additional memory capacity; and updating predefined tables to increase said amount of available memory to be utilized to increase an amount of available memory in the computer system, providing increased memory capacity to be utilized and decreasing said mirrored memory.

14. The computer storage medium storing a computer program product for implementing dynamic physical memory reallocation as recited in claim 13 wherein the step of dynamically reallocating the physical memory includes the step of dynamically reallocating a portion of the physical memory capacity as mirrored, responsive to identifying a predefined low percentage of available memory currently being utilized.

* * * * *